Oct. 26, 1937.      W. H. HERMSDORF      2,096,804
MEANS FOR GENERATING COMBUSTIBLE GAS
Original Filed Aug. 22, 1931
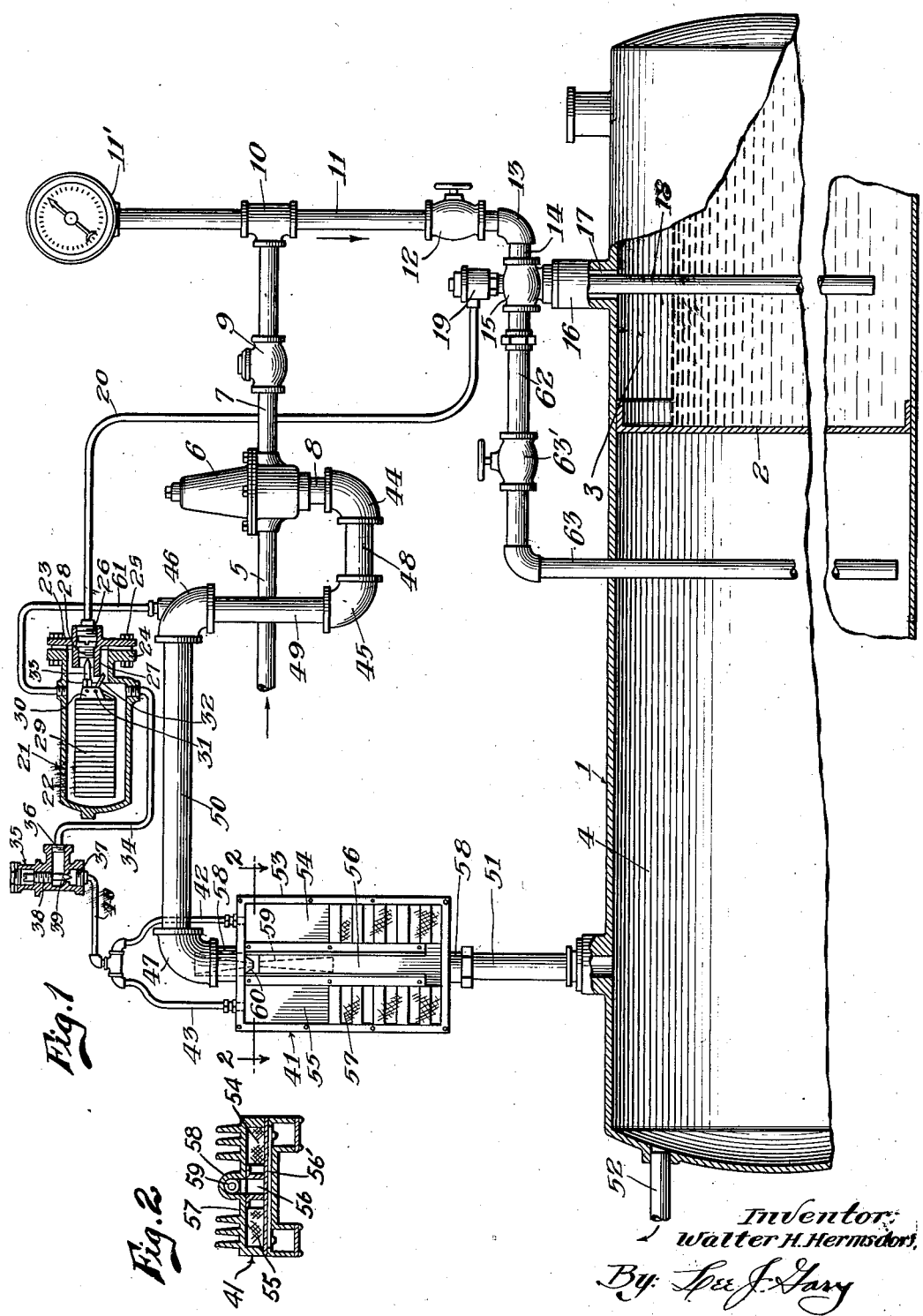

Patented Oct. 26, 1937

2,096,804

UNITED STATES PATENT OFFICE 2,096,804

MEANS FOR GENERATING COMBUSTIBLE GAS

Walter H. Hermsdorf, Chicago, Ill., assignor to S. H. G. Incorporated, Chicago, Ill., a corporation of Delaware Original application August 22, 1931, Serial No. 558,656. Divided and this application November 11, 1933, Serial No. 697,562

1 Claim. (Cl. 48—107)

This application is a division of my application Serial No. 558,656 filed August 22, 1931, of which Serial No. 46,635 filed October 24, 1935, is a continuation.

This invention relates to improvements in a means for generating combustible gas by mixing combustible vapor and air, and refers specifically to means for maintaining the ratio of vapor and air relatively constant throughout varying operating conditions.

The utility, objects and advantages of my invention will be apparent from the accompanying drawing and following detail description.

In the drawing, Fig. 1 is a vertical elevation, partly in section of apparatus embodied in my invention.

Fig. 2 is a sectional view taken on line 2—2 of Fig. 1.

Referring in detail to the drawing, 1 indicates a tank or reservoir which may be divided internally by a partition 2 providing a liquid compartment 3 and a gas compartment 4. The compartment 3 is adapted to contain a quantity of combustible liquid such as gasoline, pentane, or the like. The tank or reservoir 1 may take any desirable form such as the usual cylindrical tanks common in the art.

An air supply pipe 5 may be connected at one end to a suitable source of compressed air such as a blower or compressor, not shown. The opposite end of said pipe may be connected into a regulating valve 6. The valve 6 may be provided with two outlets into one of which the pipe 7 connects, the pipe 8 connecting into the other. The arrangement is such that compressed air passing through the pipe 5 and entering the regulating valve 6 will pass into the pipe 7. However, initially no air will pass from the regulating valve through the pipe 8 until the pressure built up within said valve reaches a predetermined maximum value. The constructional features of the valve are such that it will then permit air to pass through the pipe 8. A check valve 9 may be interposed in the pipe 7 and opens away from the regulating valve 6. In other words, air passing through the pipe 7 from the regulating valve 6 is permitted to pass in one direction only, that is, away from the regulating valve 6. The opposite end of the pipe 7 is connected to one leg of the T 10. Another leg of the T 10 may be connected to pipe 11 interposed in which is a hand operated control valve 12. The opposite end of the pipe 11 may be connected to the elbow 13 which, in turn, is connected to nipple 14, the nipple 14 serving to connect the elbow 13 and the fitting 15. The fitting 15 connects into pipe 16 which, in turn, may be connected into the liquid compartment 3 and air passing from the regulating valve 6 may be introduced into the liquid compartment 3 through the space 17 provided within the pipe 16. A pipe 18 may be concentrically disposed with respect to and within pipe 16 and may extend downwardly into the liquid compartment 3, the upper portion of said pipe passing through T 15 and being connected at its upper end to fitting 19. A pipe 20 may connect into the fitting 19 and may be connected at its opposite end to a float valve 21.

The float valve 21 may comprise a casing 22 provided with a closure 23 which may be bolted or otherwise fastened to flanges 24 provided upon one end of the casing 22 as shown at 25. The closure 23 may be provided with an aperture into which bushing 26 may be threadedly positioned, the bushing 26 serving as a connecting medium between the pipe 20 and the interior of the casing 22. The closure 23 may also be provided with an inwardly extending neck 27 into which may be threadedly positioned an apertured plug 28. A float 29 may be positioned within the casing 22 and may be provided with a lug 30 which may be pivotally mounted upon a portion of the inwardly extending neck 27, said pivotal mounting occurring at 31. A spring 32 such as a leaf spring, blade spring or the like may be operatively associated with the float 29 and operates to maintain said float in a normally horizontal position within the casing 22. A pin 33 may be carried by the lug 30 and is adapted to operate as a valve closing the aperture, not shown, within the plug 28 upon upward or downward movement of the float 29.

It can readily be seen that when sufficient liquid is introduced into the casing 22 to cause float 29 to move upwardly, said float will rotate about the axis 31 and thereby cause pin 33 to move inwardly toward the plug 28, seating the tapered end of said pin over the aperture provided in said plug. When the level of liquid within the casing 22 falls, the weight of the float causes the float to rotate downwardly about the pivot point 31 and thereby pulls pin 33 outwardly with respect to the plug 28 and permits the liquid from compartment 3 to pass into the casing 22. By the provision of a float operated valve of this character the level of liquid within the casing 22 can be maintained substantially constant inasmuch as movement of the float is responsive to very minute changes in level of the liquid within the casing. As can be readily seen the sensitivity of the operation of the float may be varied by changing the strength of the spring 32.

A pipe 34 may connect the lower portion of the casing 22 with a metering valve 35. The valve 35 may be provided with inlet 36 and outlet 37 and a pin 38 threadedly positioned within the body of the valve 35 may serve as a controlling means for the passage of liquid from the inlet 36 to the outlet 37. The lower portion of the pin may be provided with a V-shaped groove 39 which, if desired, may permit the passage of a minute quantity of liquid through the valve. It can readily be seen that by rotating pin 38 the lower portion of said pin may be brought into close proximity or removed remote from the aperture into which said pin normally sets and thereby passage of liquid through the valve may be accurately controlled.

A pipe 40 may connect the outlet of the metering valve 35 and a heating member or vaporizer 41. The stream of liquid passing through the pipe 40 to the vaporizer 41 may be divided and enter said vaporizer through both pipes 42 and 43. The purpose and operation of the heating element 41 will be hereinafter more fully described.

The heater or vaporizer 41 may comprise a casing 54 having two longitudinal compartments 54 and 55 which extend substantially the entire length of the heater 41. The two compartments 54 and 55 at their lower ends connect into a central longitudinal compartment 56. Electric heating element 56' or the like, may be positioned adjacent the walls of the compartments 54 and 55 and a plurality of transversely extending screens 57 may be disposed within said compartments. By the provision of the screens 57 the heat generated by the heating elements is transferred by conduction in a zigzag manner transversely across the compartments 54 and 55. In this manner the liquid entering the compartments 54 and 55 through the passages 42 and 43 respectively must pass through the transversely positioned screens 57 and consequently the heat conducted by said screens from the heating elements is imparted to said downwardly passing liquid and the same is changed to the vapor state. The vapors thus generated pass upwardly through the central compartment 56.

Disposed parallel to the central compartment 56 and positioned adjacent thereto is a tube 58 provided intermediate its length with a restricted portion 59 having substantially the form of a Venturi tube. An opening 60 may connect the upper portion of the compartment 56 with the neck of the Venturi tube 59 and as can readily be seen, air passing from the regulating valve 6 into the tube 58 will induce the passage of the vapors within 56 through the tube 58, pipe 51 and into compartment 4.

A pipe 61 may connect at one end into the upper portion of the casing 22 of the float valve 21 and may be connected at its opposite end into the elbow 46. In this manner, it can readily be seen, that the interior of the float valve 21 will be subjected to the same pressure which exists within the pipe connections between the regulating valve 6 and the vaporizer 41.

In operation, the compartment 3 may be substantially filled with a combustible, readily vaporizable liquid such as a hydrocarbon liquid, gasoline, pentane, alcohols or the like. Air under pressure may be passed through the pipe 5 to the regulating valve 6 and the arrangement is such that said air will pass directly through the regulating valve 6 and be discharged through the pipe 7. The flow of air continues through the pipe 7, check valve 9, pipe 11, valve 12 and into the upper portion of the compartment 3 thereby establishing a condition of superatmospheric pressure within said compartment. When the pressure within compartment 3 reaches a predetermined maximum as indicated by the pressure gauge 11, the valve 6 automatically acts to permit air under pressure to be discharged through the outlet 8 in addition to its passage through the outlet 7. In this manner a flow of air under pressure takes place through the outlet pipe 8, pipes 48, 49 and 50, and through the neck of the venturi 59, the pipe 51 and into the gas chamber 4. At this period, however, inasmuch as superatmospheric pressure exists within the compartment 3, liquid from said compartment will be forced upwardly through the pipe 18, the line 20 and into the casing 22 until sufficient liquid has accumulated therein to actuate the float 29 to close communication between the line 20 and the casing 22. By the provision of the pipe 61 the liquid within the casing 22 will be subjected to the same pressure as exists within the piping system 8, 48, 49 and 50, and consequently said liquid will be discharged from the casing 22 through the pipe 34, through the metering valve 35 and into the vaporizer 41. Said liquid, as has been hereinbefore described, will contact the hot walls and the hot screens 57 within the compartments 54 and 55 and will thus be vaporized. Air, simultaneously, of course, is passed through the Venturi tube 59 and inasmuch as the connection between the Venturi tube 59 and the compartment 56 occurs at the neck of the Venturi tube, a zone of reduced pressure will be established by the increased velocity of the air passing through said neck and, consequently, the vapors contained within the compartment 56 will be induced through the opening 60 and will admix with the air passing through the Venturi tube. The air carrying the vapors in entrainment will then be passed downwardly through the pipe 51 and into compartment 4. In this manner a highly efficient combustible gas having a relatively constant B. t. u. content will be formed.

If desired, the operation of the blower which furnishes air to the system may be so arranged as to be energized when the pressure within the gas compartment has reached a predetermined minimum and may be shut off when the pressure within said compartment reaches a predetermined maximum. For instance, the pressure of the gas within the compartment 4 may be maintained within four to six pounds per square inch as a maximum and two to three pounds per square inch as a minimum.

Under these circumstances it can readily be seen that when the pressure within the gas compartment 4 is being built up from the minimum pressure at which the blower or air compressor begins its operation to the maximum pressure at which said operation ceases, the air carrying vapors in entrainment passing through the pipe 51 into the compartment 4 will be discharging against a variable back pressure, that is, a pressure which varies between the minimum to the maximum.

It has heretofore been proposed to introduce the combustible liquid into contact with the air by maintaining substantially constant pressure upon the combustible liquid within the liquid chamber. The air that is introduced into contact with the liquid, of course, is under blower pressure, consequently it can be seen that as the back pressure within the gas compartment 4 varies, the rate of the passage of air from the blower will be decreased due to the raise in pressure of the compartment 4. However, inasmuch as the pressure within the liquid compartment is constant, a variable quantity of liquid will be introduced into entrainment with the air per unit of time during the building up of pressure within the gas compartment from the predetermined minimum value to the predetermined maximum value. It can readily be seen that a variation of this sort tends to the production of a gas having a non-uniform, calorific value.

To obviate this difficulty I propose to isolate a quantity of liquid from the main bulk supply of liquid within the compartment 3, said isolated quantity being maintained within the float valve casing 22. The pressure within the casing 22 inasmuch as said casing is connected into the piping system between the regulating valve 6 and the vaporizer 41 by means of the pipe 61 is maintained at blower pressure, consequently, the pressure of the air admixed with combustible liquid and the pressure of the combustible liquid is obtained from the same source. Hence when the pressure within the compartment 4 builds up from the predetermined minimum value to the predetermined maximum value, the velocity of air through the Venturi tube 59 will decrease, in other words, a smaller quantity of air per unit of time will pass the neck of the Venturi tube. However, inasmuch as the pressure upon the liquid varies directly as the air pressure upon said liquid in compartment 22, a smaller quantity of liquid will be introduced into the vaporizer 41 during the period that the lesser quantity of air passes through the Venturi tube. In this manner the ratio of the mixture of liquid and air may be maintained substantially constant even though the pressure into which said mixture is being discharged varies. In addition, the efficiency of blowers and air compressors, more particularly blowers of the rotary type, decreases rapidly with an increase in back pressure. Hence, by subjecting the liquid within the casing 22 to the same pressure as that of the air in the blower connection to the vaporizer 41, this variation in efficiency, due to the varying pressure within the compartment 4 is compensated. This permits the use of an economical type of blower which would be impractical to otherwise use.

By the provision of the casing 22 maintaining a bulk supply of liquid, the static pressure head of the liquid is maintained constant inasmuch as the float 29 tends to maintain the level of liquid within the casing 22 constant. Therefore, inasmuch as the static pressure head of the liquid is constant and the pressure on the liquid due to the air from the piping system 8, 48, 49 and 50 varies in proportion to the passage of the air through said system, constant proportions of liquid and air will be mixed within the vaporizer 41 and, hence, regardless of the varying pressure into which the combustible mixture is being discharged the proportions of said mixture will not change except by manipulating the metering valve 35.

However, when the liquid is heated within the vaporizer 41 and changes its state to the vapor state, a back pressure may be introduced into the system which may tend to cause the trapping of the vapors within the vaporizer 41. To compensate for this I may provide a Venturi tube 59 which tends to cause an area of reduced pressure adjacent its neck and a connection is made at said neck with the central compartment 56 thereby inducing the vapors within the vaporizer to flow toward the neck of the Venturi tube.

The ratio of the quantity of air mixed with the quantity of liquid determines the heat value of the resultant gas. If it is desired to change the heat content of the gas generated, the quantity of liquid introduced into contact with the air may be readily controlled by manipulation of metering valve 35, the operation of which has been hereinbefore described.

An additional advantage which exists in the use of an isolated body of liquid maintained under a pressure which varies as the blower pressure is the elimination of the loss in pressure which the level of the liquid in the main bulk supply tank lowers or decreases. It can readily be seen that if the liquid were discharged directly from the bulk supply contained within the compartment 3 into contact with the compressed air, the pressure of said liquid would vary since the height of the liquid within the compartment 3 would vary. In other words, as the liquid within compartment 3 was consumed, a greater pressure would be utilized in forcing the liquid from its lowered position within the compartment 3 to the vaporizer, consequently as the level of liquid within the compartment 3 would lower, other things being equal, the calorific value of the gas would likewise decrease and the production of a gas having a constant B. t. u. content would be substantially impossible.

By the use of the isolated body of liquid within the float valve 22, the liquid contained within said valve or within the casing 22, would not only be subjected to a pressure equal to the pressure of the blower, but inasmuch as the float 29 maintained the liquid within said compartment constant, the pressure of the liquid introduced to the vaporizer 41 due to the constant head of liquid within the casing 22 would be constant. Consequently, the change in B. t. u. content of the generated gas due to the varying head of liquid within the liquid compartment is eliminated.

A pipe 62 may be connected into the fitting 15 at one end and may be connected to pipe 63 at the other which extends downwardly into the gas compartment 4. A valve 63' may be interposed in the pipe 62 and may, if desired, be manually operated. By the provision of this piping system in the event that liquid, combustible or otherwise, accumulates within the gas compartment 4, the pressure within the liquid compartment 3 may be relieved in an obvious manner and the valve 63 opened. At this period inasmuch as the pressure within the gas compartment 4 is greater than the pressure within the liquid compartment 3, said accumulation of liquid in the lower portion of compartment 4 may be forced upwardly through the pipe 63 and into the compartment 3. Also, by the provision of a system of pipes of this character, the liquid may be removed from one compartment to the other in case of emergency, for instance, an injury to the confining walls of one or the other of the compartments.

It is apparent that herein is provided a method and means of making combustible gas which may be used either for home or industrial purposes; a method of generating combustible gas whereby the calorific value thereof is maintained substantially constant throughout varying operating conditions. The apparatus suitable for carrying out my invention is of relatively simple construction, is rugged and can be economically constructed and operated.

By the expression "atmospheric air" as used in the specification and claim is meant, air which is unimpregnated with the vapors of a combustible liquid.

I claim as my invention:

An apparatus for making carburetted air gas which comprises in combination, a chamber for combustible liquid and a chamber for combustible gas, means connecting into said liquid chamber whereby air under pressure may be supplied to said chamber, an electrically treated vaporizer, an air pipe connecting into said gas chamber, means for passing air through said air pipe when the air pressure in the liquid chamber reaches a predetermined maximum, the air passed to the liquid chamber and the air passed through said air pipe being derived from the same source, means connecting said liquid chamber to said vaporizer for conducting liquid to said vaporizer wherein it is vaporized, said air pipe being positioned adjacent said vaporizer, a Venturi tube comprising a portion of said air pipe, said Venturi tube having an opening in its neck which connects with said vaporizer whereby vapors are drawn into the air passing through said tube.

WALTER H. HERMSDORF.